(12) United States Patent
Fukasaku et al.

(10) Patent No.: US 11,519,400 B2
(45) Date of Patent: *Dec. 6, 2022

(54) IN-VEHICLE MOTOR-DRIVEN COMPRESSOR

(71) Applicant: KABUSHIKI KAISHA TOYOTA JIDOSHOKKI, Kariya (JP)

(72) Inventors: Hiroshi Fukasaku, Kariya (JP); Yoshiki Nagata, Kariya (JP); Takashi Kawashima, Kariya (JP); Shunsuke Ambo, Kariya (JP); Junya Kaida, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 241 days.

This patent is subject to a terminal disclaimer.

(21) Appl. No.: 17/017,882

(22) Filed: Sep. 11, 2020

(65) Prior Publication Data
US 2021/0088038 A1 Mar. 25, 2021

(30) Foreign Application Priority Data
Sep. 25, 2019 (JP) .............................. JP2019-174304

(51) Int. Cl.
*F04B 35/04* (2006.01)
*H02M 7/00* (2006.01)
(Continued)

(52) U.S. Cl.
CPC ............. *F04B 35/04* (2013.01); *H02M 1/126* (2013.01); *H02M 7/003* (2013.01); *B60W 10/08* (2013.01)

(58) Field of Classification Search
CPC .... F04B 35/04; H01F 27/2895; H01F 27/324; H01F 37/00; H01F 27/363; B60W 10/08;
(Continued)

(56) References Cited

U.S. PATENT DOCUMENTS

| 5,546,065 A | * | 8/1996 | Vinciarelli | ............ | H01F 27/346 |
| | | | | | 336/212 |
| 2009/0002110 A1 | * | 1/2009 | Ahangar | ............... | H01F 27/266 |
| | | | | | 336/60 |

(Continued)

FOREIGN PATENT DOCUMENTS

| DE | 10 2015 107 203 A1 | 11/2015 |
| JP | 2018-18865 A | 2/2018 |
| WO | 2017/170817 A1 | 10/2017 |

*Primary Examiner* — Jared Fureman
*Assistant Examiner* — Esayas G Yeshaw
(74) *Attorney, Agent, or Firm* — Sughrue Mion, PLLC

(57) ABSTRACT

An in-vehicle motor-driven compressor includes a common mode choke coil including an annular core having a through-hole, a first winding and a second winding wound around the core, and an annular conductor. The second winding is opposed to the first winding while being spaced apart from the first winding. The conductor surrounds the first and second windings, and the core. The conductor includes sections opposed to each other with the through-hole in between. The core is symmetrical with respect to at least one symmetry axis when the through-hole is viewed from the front. The first winding is located on one side of the at least one symmetry axis, and the second winding is located on the other side of the symmetry axis, so that the at least one symmetry axis is located between the first and second windings. The core includes an exposed section not covered with the conductor.

5 Claims, 13 Drawing Sheets

(51) Int. Cl.
*H02M 1/12* (2006.01)
*B60W 10/08* (2006.01)

(58) Field of Classification Search
CPC ........ H02M 1/126; H02M 1/14; H02M 1/123;
H02M 7/003; H02M 7/219
See application file for complete search history.

(56) References Cited

U.S. PATENT DOCUMENTS

| | | |
|---|---|---|
| 2015/0332836 A1 | 11/2015 | Lee |
| 2017/0288512 A1 | 10/2017 | Kagawa et al. |
| 2018/0198350 A1 | 7/2018 | Ambo et al. |
| 2022/0076879 A1* | 3/2022 | Arasawa ............... H01F 27/266 |

\* cited by examiner

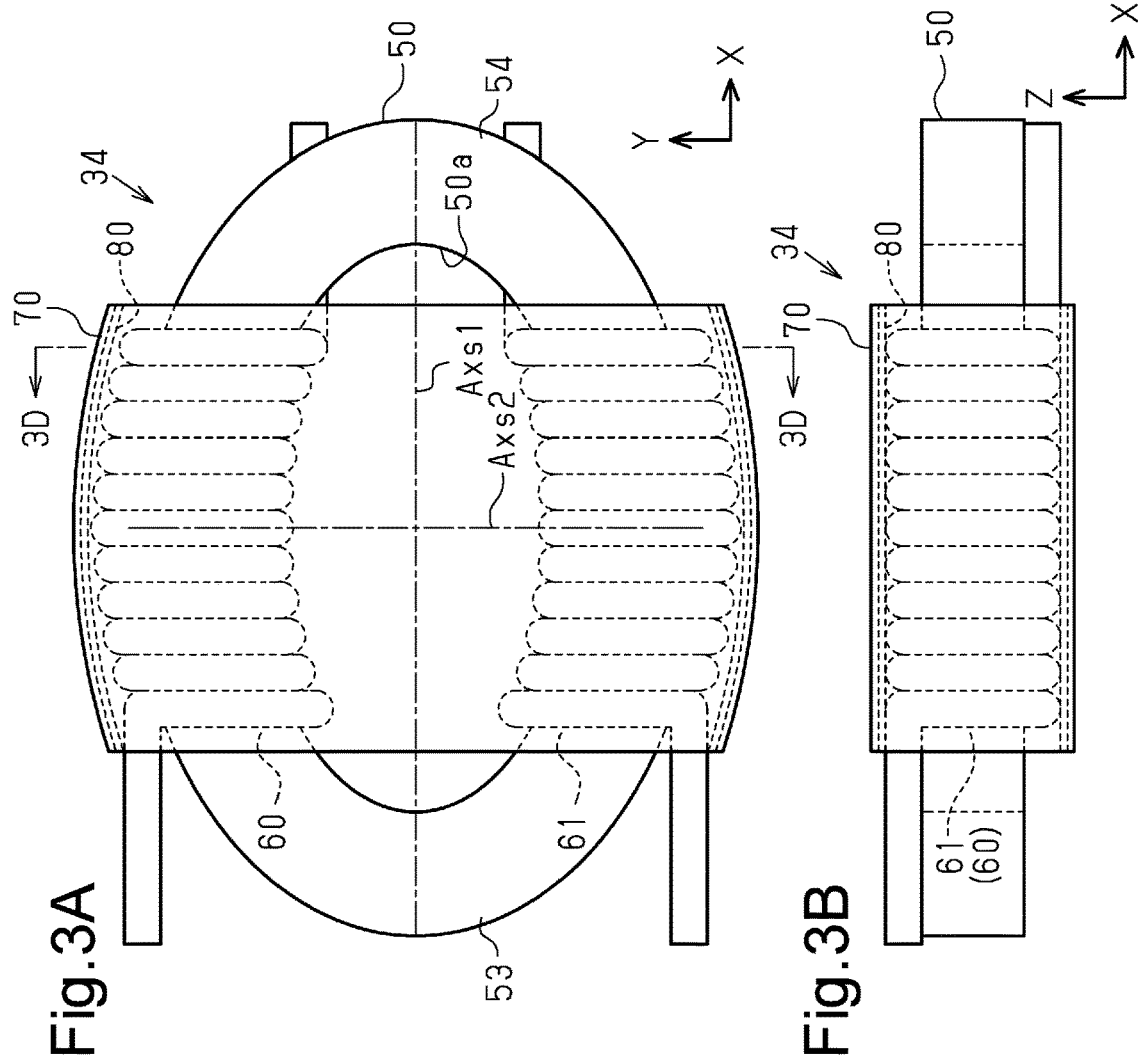

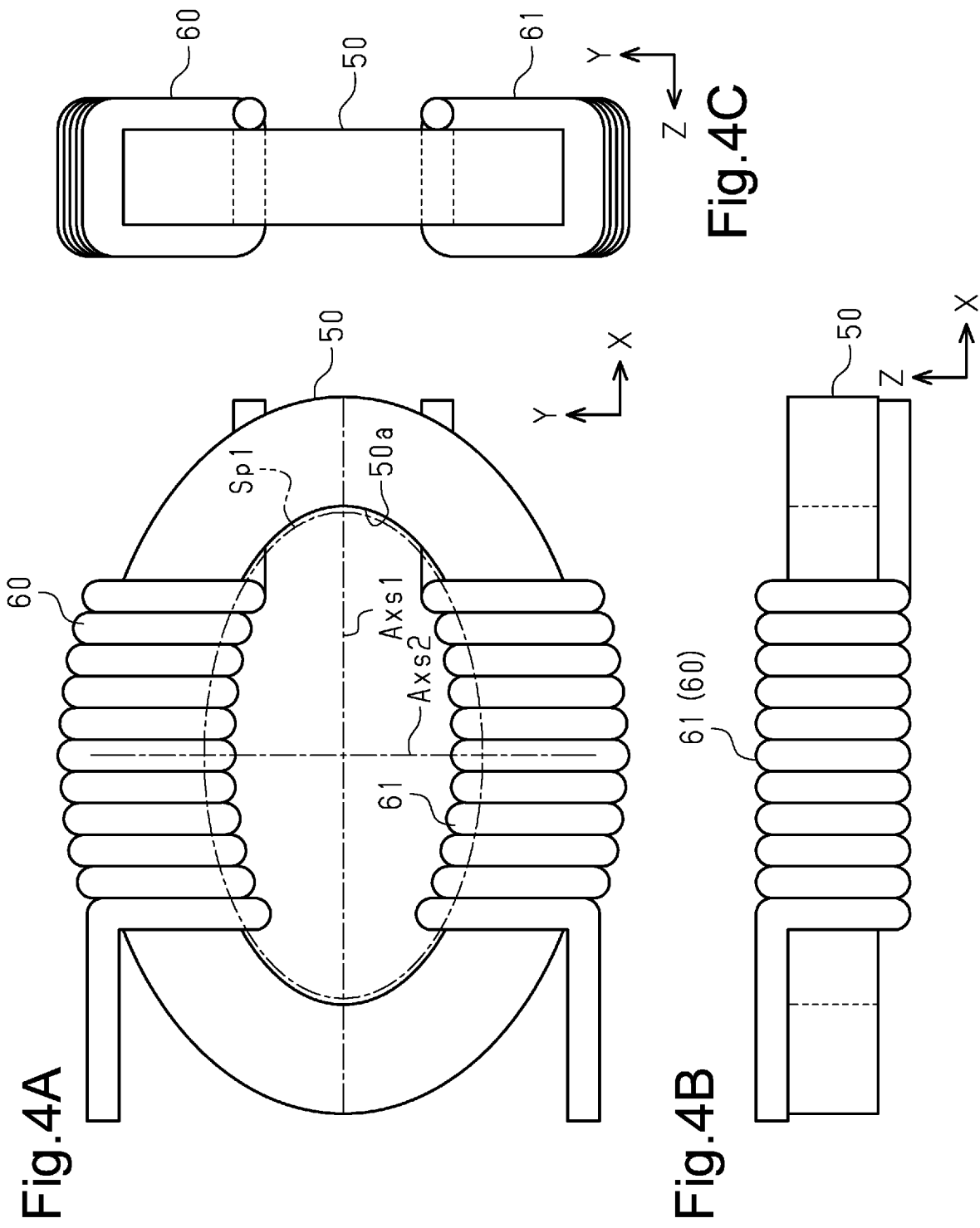

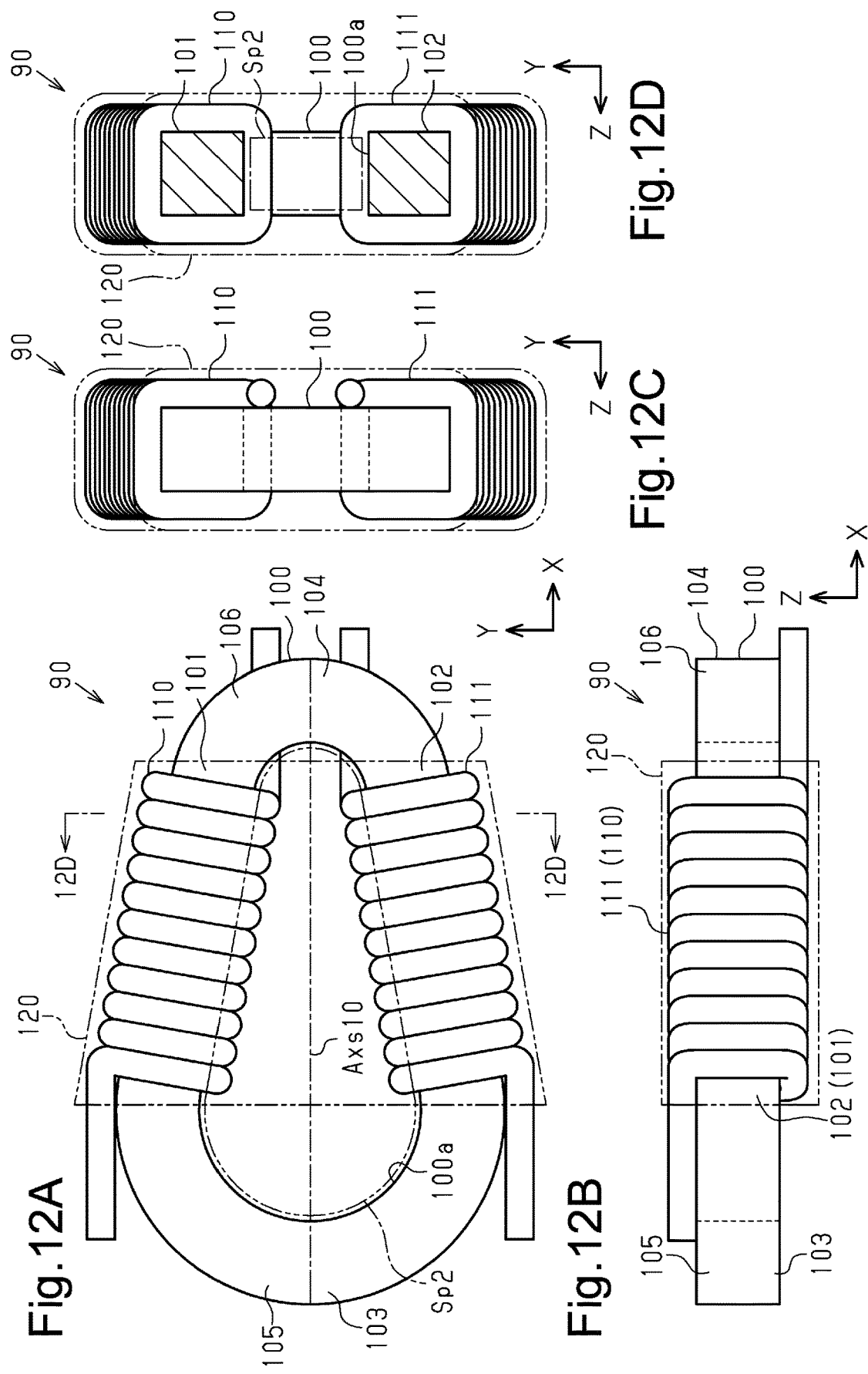

IN-VEHICLE MOTOR-DRIVEN COMPRESSOR

BACKGROUND

1. Field

The present disclosure relates to an in-vehicle motor-driven compressor.

2. Description of Related Art

International Publication WO 2017/170817 discloses a choke coil covered with a conductor as a configuration of a common mode choke coil used in an inverter device that drives an electric motor in an in-vehicle motor-driven compressor. When a normal-mode current flows through such a choke coil, leakage magnetic flux is generated. The leakage magnetic flux in turn causes an induced current to flow through the conductor. The induced current is converted into a thermal energy in the conductor. The choke coil thus has a damping effect.

In a case where a choke coil is entirely covered with a conductor, the heat is likely to be trapped inside. On the other hand, if a choke coil is designed to have a section not covered with a conductor in order to enhance the heat radiation performance, induced current would not flow readily in that section, reducing the damping effect.

SUMMARY

Accordingly, it is an objective of the present disclosure to provide an in-vehicle motor-driven compressor having a filter circuit with superior heat radiation performance and damping effect.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an in-vehicle motor-driven compressor is provided that includes a compression unit configured to compress fluid, an electric motor configured to drive the compression unit, and an inverter device configured to drive the electric motor. The inverter device includes an inverter circuit configured to convert DC power to AC power, and a noise reducing unit that is provided on an input side of the inverter circuit and is configured to reduce common mode noise and normal mode noise included in the DC power before the DC power is supplied to the inverter circuit. The noise reducing unit includes a common mode choke coil, and a smoothing capacitor that makes up a low-pass filter circuit together with the common mode choke coil. The common mode choke coil includes an annular core that includes a through-hole, a first winding wound around the core, a second winding wound around the core, the second winding being opposed to the first winding while being spaced apart from the first winding, and an annular conductor that surrounds the first winding, the second winding, and the core. The conductor includes sections that are opposed to each other with the through-hole in between. When the through-hole is viewed from a front, the core has a shape that is symmetrical with respect to each of symmetry axes, which have different lengths. The first winding is located on one side of one of the symmetry axes, and the second winding is located on an other side of the one of the symmetry axes, so that the one of the symmetry axes is located between the first winding and the second winding. The core includes an exposed section that is not covered with the conductor.

In another aspect, an in-vehicle motor-driven compressor is provided that includes a compression unit configured to compress fluid, an electric motor configured to drive the compression unit, and an inverter device configured to drive the electric motor. The inverter device includes an inverter circuit configured to convert DC power to AC power, and a noise reducing unit that is provided on an input side of the inverter circuit and is configured to reduce common mode noise and normal mode noise included in the DC power before the DC power is supplied to the inverter circuit. The noise reducing unit includes a common mode choke coil, and a smoothing capacitor that makes up a low-pass filter circuit together with the common mode choke coil. The common mode choke coil includes an annular core that includes a through-hole, a first winding wound around the core, a second winding wound around the core, the second winding being opposed to the first winding while being spaced apart from the first winding, and an annular conductor that surrounds the first winding, the second winding, and the core. The conductor includes sections that are opposed to each other with the through-hole in between. The core is symmetrical with respect to an only symmetry axis when the through-hole is viewed from a front. The first winding is located on one side of the symmetry axis, and the second winding is located on an other side of the symmetry axis, so that the symmetry axis is located between the first winding and the second winding. The core includes an exposed section that is not covered with the conductor.

Other features and aspects will be apparent from the following detailed description, the drawings, and the claims.

BRIEF DESCRIPTION OF THE DRAWINGS

FIG. 3A is a plan view of a common mode choke coil according to a first embodiment.

FIG. 3B is a front view of the common mode choke coil shown in FIG. 3A.

FIG. 3C is a right side view of the common mode choke coil shown in FIG. 3A.

FIG. 3D is a cross-sectional view taken along line 3D-3D of FIG. 3A.

FIG. 4A is a plan view of a core and windings.

FIG. 4B is a front view of the core and the windings shown in FIG. 4A.

FIG. 4C is a right side view of the core and the windings shown in FIG. 4A.

FIG. 12A is a plan view of a common mode choke coil according to a second embodiment.

FIG. 12B is a front view of the common mode choke coil of FIG. 12A.

FIG. 12C is a right side view of the common mode choke coil of FIG. 12A.

FIG. 12D is a cross-sectional view taken along line 12D-12D of FIG. 12A.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An in-vehicle motor-driven compressor 11 according to a first embodiment will now be described with reference to the drawings. The in-vehicle motor-driven compressor 11 of the present embodiment includes a compression unit 18 that compresses fluid, which is refrigerant, and is used in an in-vehicle air conditioner 10. That is, the fluid to be compressed in the in-vehicle motor-driven compressor 11 in the present embodiment is a refrigerant.

Figure 1:
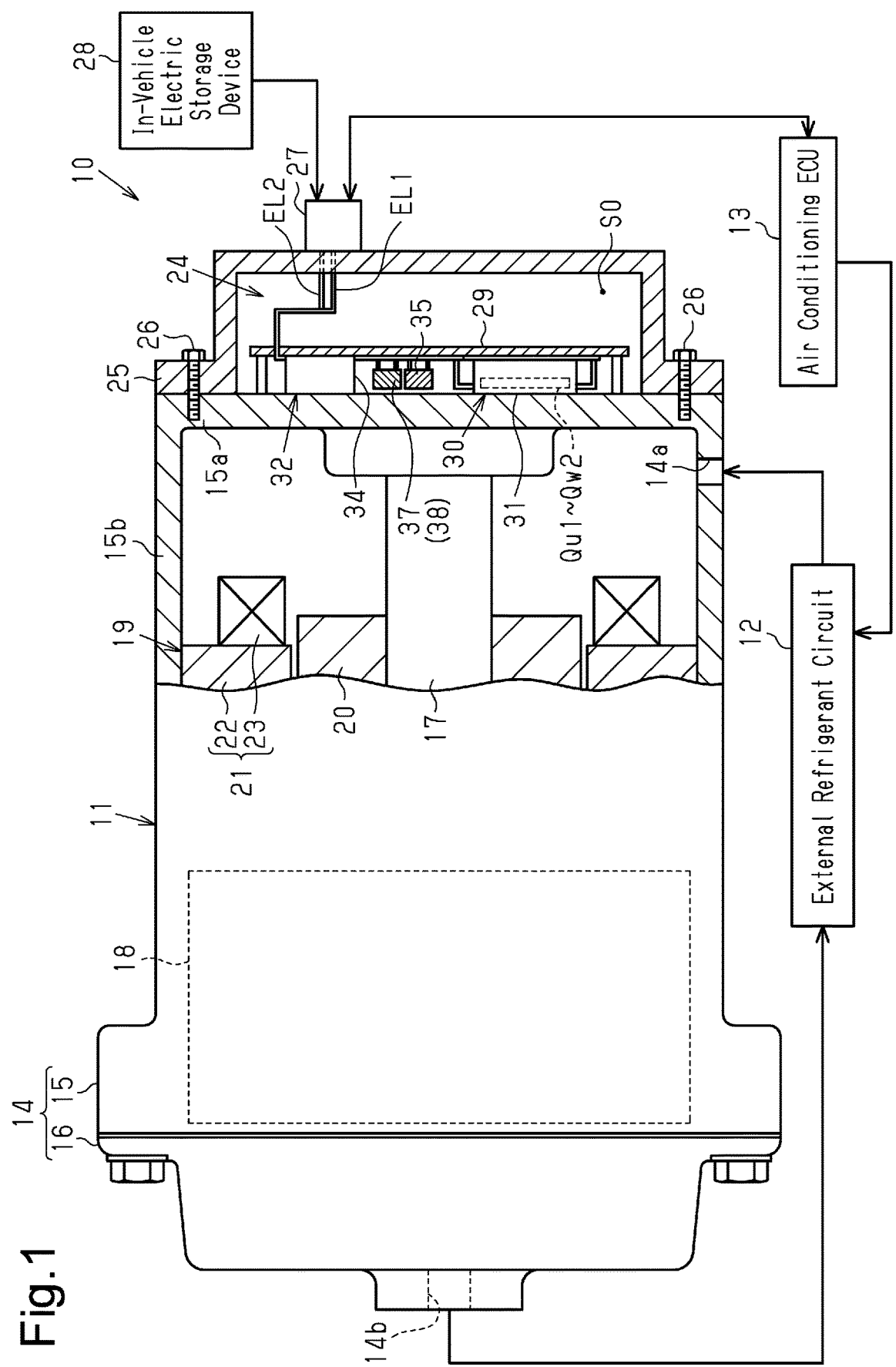
FIG. 1 is a diagrammatic view showing an in-vehicle motor-driven compressor.

As shown in FIG. 1, the in-vehicle air conditioner 10 includes the in-vehicle motor-driven compressor 11 and an external refrigerant circuit 12. The external refrigerant circuit 12 supplies fluid, which is a refrigerant, to the in-vehicle motor-driven compressor 11. The external refrigerant circuit 12 includes, for example, a heat exchanger and an expansion valve. The in-vehicle motor-driven compressor 11 compresses the refrigerant, and the external refrigerant circuit 12 performs heat exchange and expansion of the refrigerant. Accordingly, the in-vehicle air conditioner 10 cools or warms the passenger compartment.

The in-vehicle air conditioner 10 includes an air conditioning ECU 13 that controls the entire in-vehicle air conditioner 10. The air conditioning ECU 13 is configured to obtain parameters such as the temperature of the passenger compartment and a set target temperature. Based on the parameters, the air conditioning ECU 13 outputs various commands such as an ON-OFF command to the in-vehicle motor-driven compressor 11.

The in-vehicle motor-driven compressor 11 includes a housing 14 that has a suction port 14a, through which refrigerant is drawn from the external refrigerant circuit 12.

The housing 14 is made of a thermally conductive material, for example, a metal such as aluminum. The housing 14 is grounded to the body of the vehicle.

The housing 14 includes a suction housing member 15 and a discharge housing member 16, which are assembled together. The suction housing member 15 is a tubular body with an opening at one end and has an end wall 15a and a circumferential wall 15b, which extends from the periphery of the end wall 15a toward the discharge housing member 16. The end wall 15a has, for example, a substantially plate-like shape, and the circumferential wall 15b has, for example, a substantially tubular shape. The discharge housing member 16 is attached to the suction housing member 15 while closing the opening of the suction housing member 15. Accordingly, an internal space is defined in the housing 14.

The suction port 14a is provided in the circumferential wall 15b of the suction housing member 15. Specifically, the suction port 14a is arranged in a section of the circumferential wall 15b of the suction housing member 15 that is closer to the end wall 15a than to the discharge housing member 16.

The housing 14 has a discharge port 14b, through which refrigerant is discharged. The discharge port 14b is provided in the discharge housing member 16, specifically, in a section of the discharge housing member 16 that is opposed to the end wall 15a.

The in-vehicle motor-driven compressor 11 includes a rotary shaft 17, a compression unit 18, and an electric motor 19, which are accommodated in the housing 14.

The rotary shaft 17 is rotationally supported by the housing 14. The rotary shaft 17 is arranged with its axial direction coinciding with the thickness direction of the end wall 15a (in other words, the axial direction of the circumferential wall 15b). The rotary shaft 17 and the compression unit 18 are coupled to each other.

The compression unit 18 is arranged in the housing 14 at a position closer to the discharge port 14b than to the suction port 14a (in other words, than to the end wall 15a). When the rotary shaft 17 rotates, the compression unit 18 compresses refrigerant that has been drawn into the housing 14 through the suction port 14a and discharges the compressed refrigerant through the discharge port 14b. The specific configuration of the compression unit 18 is not particularly limited and may be any type such as a scroll type, a piston type, or a vane type.

The electric motor 19 is arranged in the housing 14 between the compression unit 18 and the end wall 15a. The electric motor 19 rotates the rotary shaft 17 to drive the compression unit 18. The electric motor 19 includes, for example, a cylindrical rotor 20 fixed to the rotary shaft 17 and a stator 21 fixed to the housing 14. The stator 21 includes a cylindrical stator core 22 and coils 23 wound around the teeth of the stator core 22. The rotor 20 and the stator 21 are opposed to each other in the radial direction of the rotary shaft 17. When the coils 23 are energized, the rotor 20 and the rotary shaft 17 rotate, so that the compression unit 18 compresses refrigerant.

As shown in FIG. 1, the in-vehicle motor-driven compressor 11 includes a driving device 24 and a cover member 25. The driving device 24 drives the electric motor 19 and receives DC power. The cover member 25 defines an accommodation chamber S0, which accommodates the driving device 24.

The cover member 25 is made of a nonmagnetic and conductive material with heat conductivity, for example, a metal such as aluminum.

The cover member 25 is a tubular body with an opening at one end, opens to the housing 14, specifically, to the end wall 15a of the suction housing member 15. The cover member 25 is attached to the end wall 15a by bolts 26 with the open end abutting against the end wall 15a. The opening of the cover member 25 is closed by the end wall 15a. The accommodation chamber S0 is defined by the cover member 25 and the end wall 15a.

The accommodation chamber S0 is arranged outside the housing 14 and is located on the opposite side of the end wall 15a from the electric motor 19. The compression unit 18, the electric motor 19, and the driving device 24 are arranged in the axial direction of the rotary shaft 17.

The cover member 25 includes a connector 27, which is electrically connected to the driving device 24. DC power is supplied to the driving device 24 from an in-vehicle electric storage device 28 via the connector 27. The air conditioning ECU 13 and the driving device 24 are electrically connected to each other via the connector 27. The in-vehicle electric storage device 28 is a DC power supply mounted on the vehicle, which is, for example, a rechargeable battery, a capacitor, or the like.

As shown in FIG. 1, the driving device 24 includes a circuit board 29, an inverter device 30 provided on the circuit board 29, and two connection lines EL1, EL2, which electrically connect the connector 27 and the inverter device 30 to each other.

The circuit board 29 is shaped like a plate. The circuit board 29 is arranged to be opposed to the end wall 15a at a predetermined distance in the axial direction of the rotary shaft 17.

The inverter device 30 is configured to drive the electric motor 19. The inverter device 30 includes an inverter circuit 31 (see FIG. 2) and a noise reducing unit 32 (see FIG. 2). The inverter circuit 31 is configured to convert DC power into AC power. The noise reducing unit 32 is provided on the input side of the inverter circuit 31 and is configured to reduce common mode noise and normal-mode noise included in the DC power before the DC power is supplied to the inverter circuit 31.

Next, the electrical configuration of the electric motor 19 and the driving device 24 will be described.

Figure 2:
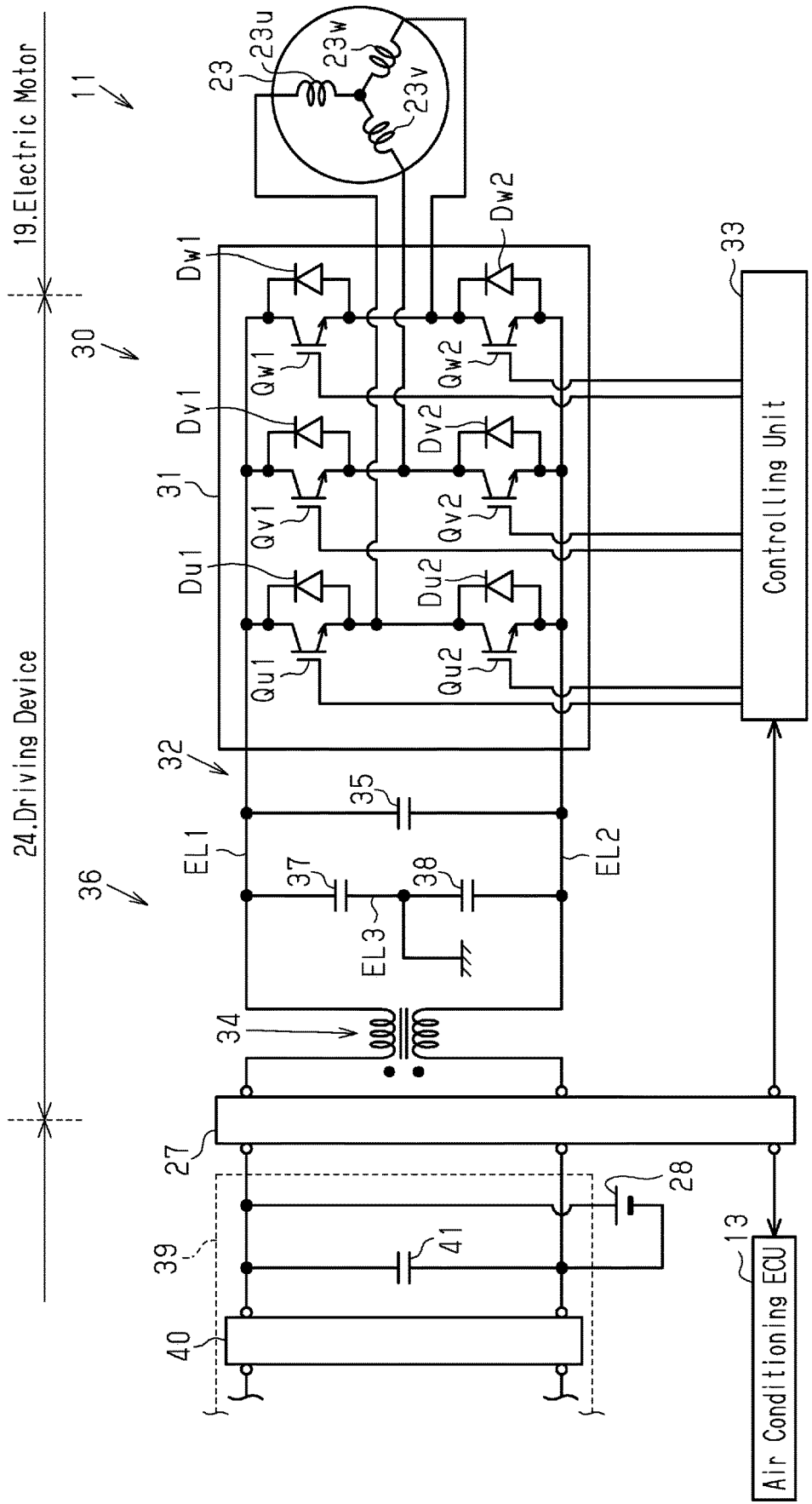
FIG. 2 is a circuit diagram of a driving device and an electric motor in the motor-driven compressor shown in FIG. 1.

As shown in FIG. 2, the coils 23 of the electric motor 19 are of a three-phase structure, for example, with a U-phase coil 23u, a V-phase coil 23v, and a W-phase coil 23w. The coils 23u to 23w are connected in a Y-connection.

The inverter circuit 31 includes U-phase switching elements Qu1, Qu2, which correspond to the U-phase coil 23u, V-phase switching elements Qv1, Qv2, which correspond to the V-phase coil 23v, and W-phase switching elements Qw1, Qw2, which correspond to the W-phase coil 23w. Each of the switching elements Qu1 to Qw2 is, for example, a power switching element such as an IGBT. The switching elements Qu1 to Qw2 respectively include freewheeling diodes (body diodes) Du1 to Dw2.

The U-phase switching elements Qu1, Qu2 are connected to each other in series by a connection wire that is connected to the U-phase coil 23u. The serially-connected body of the U-phase switching elements Qu1, Qu2 is electrically connected to the connection lines EL1, EL2. The serially-connected body receives DC power from the in-vehicle electric storage device 28 via the connection lines EL1, EL2.

Except for the connected coil, the other switching elements Qv1, Qv2, Qw1, Qw2 have the same connection structure as the U-phase power switching elements Qu1, Qu2.

The driving device 24 includes a controlling unit 33, which controls switching operations of the switching elements Qu1 to Qw2. The controlling unit 33 may be a processing circuit that includes, for example, at least one dedicated hardware circuit and/or at least one processor that operates in accordance with a computer program (software). The processor includes a CPU and a memory such as a RAM and a ROM. The memory stores program codes or commands configured to cause the processor to execute various processes. The memory, or a computer readable medium, includes any type of medium that is accessible by a general-purpose computer or a dedicated computer.

The controlling unit 33 is electrically connected to the air conditioning ECU 13 via the connector 27. Based on commands from the air conditioning ECU 13, the controlling unit 33 periodically turns on and off the switching elements Qu1 to Qw2. Specifically, based on commands from the air conditioning ECU 13, the controlling unit 33 performs pulse width modulation control (PWM control) on the switching elements Qu1 to Qw2. More specifically, the controlling unit 33 uses a carrier signal and a commanded voltage value signal (signal for comparison) to generate control signals. The controlling unit 33 performs ON-OFF control of the switching elements Qu1 to Qw2 by using the generated control signals, thereby converting DC power to AC power.

The noise reducing unit 32 has a common mode choke coil 34 and an X capacitor 35. The X capacitor 35, which is a smoothing capacitor, makes up a low-pass filter circuit 36 together with the common mode choke coil 34. The low-pass filter circuit 36 is provided on the connection lines EL1, EL2. Regarding the relationship with other circuits, the low-pass filter circuit 36 is provided between the connector 27 and the inverter circuit 31.

The common mode choke coil 34 is provided on the connection lines EL1, EL2.

The X capacitor 35 is provided on the output stage of the common mode choke coil 34 (on the side closer on which the inverter circuit 31 is located) and is electrically connected to the connection lines EL1, EL2. A normal mode inductance generated by the leakage magnetic flux from the common mode choke coil 34 and the X capacitor 35 make up an LC resonance circuit. That is, the low-pass filter circuit 36 of the present embodiment is an LC resonance circuit including the common mode choke coil 34.

Y capacitors 37, 38 are connected in series. Specifically, the driving device 24 includes a bypass line EL3 that connects a first end of the first Y capacitor 37 and a first end of the second Y capacitor 38 to each other. The bypass line EL3 is grounded to the body of the vehicle.

The serially-connected body made up of the Y capacitors 37, 38 is provided between the common mode choke coil 34 and the X capacitor 35 and is electrically connected to the common mode choke coil 34. A second end of the first Y capacitor 37 on the side opposite to the first end is connected to the first connection line EL1, more specifically, to a section of the first connection line EL1 that connects the first winding of the common mode choke coil 34 and the inverter circuit 31 to each other. A second end of the second Y capacitor 38 on the side opposite to the first end is connected to the second connection line EL2, more specifically, to a section of the second connection line EL2 that connects the second winding of the common mode choke coil 34 and the inverter circuit 31 to each other.

The in-vehicle devices of the vehicle include, for example, a power control unit (PCU) 39, which is provided separately from the driving device 24. The PCU 39 uses DC power from the in-vehicle electric storage device 28 to drive a vehicle-driving motor mounted in the vehicle. That is, in the present embodiment, the PCU 39 and the driving device 24 are connected in parallel to the in-vehicle electric storage device 28, and the in-vehicle electric storage device 28 is shared by the PCU 39 and the driving device 24.

The PCU 39 includes a boost converter 40 and a power supply capacitor 41. The boost converter 40 includes a boost switching element. The power supply capacitor 41 is connected in parallel with the in-vehicle electric storage device 28. The boost converter 40 periodically turns the boost switching element on and off to boost the DC power supplied from the in-vehicle electric storage device 28. Although not illustrated, the PCU 39 includes a vehicle-driving inverter that converts the DC power boosted by the boost converter 40 to power that drives the vehicle-driving motor.

In the above described configuration, noise is generated by switching actions of the boost switching element. The noise flows into the driving device 24 as normal-mode noise. In other words, the normal-mode noise includes a noise component corresponding to the switching frequency of the boost switching element.

Next, the configuration of the common mode choke coil 34 will be described with reference to FIGS. 3A, 3B, 3C, 3D, 4A, 4B, and 4C.

The common mode choke coil 34 is configured to limit transmission of high frequency noise generated in the PCU 39 to the inverter circuit 31. In particular, the common mode choke coil 34 is used as an L component in the low-pass filter circuit (LC filter) 36 that eliminates the normal mode noise (differential mode noise) by utilizing the leakage inductance as a normal inductance. That is, the single common mode choke coil 34 can cope with the common mode noise and the normal mode noise (differential mode noise). Thus, there is no need to use a common mode choke coil and a normal choke (differential mode) coil, separately.

In the drawings, a three-axis orthogonal coordinate system is defined in which the axial direction of the rotary shaft 17 in FIG. 1 is defined as the Z-direction, and the directions orthogonal to the Z-direction are defined as the X- and Y-directions.

As shown in FIGS. 3A, 3B, 3C, and 3D, the common mode choke coil 34 includes an annular core 50, a first winding 60, a second winding 61, and a metal thin film 70, which is an annular conductor. The term "annular" as used in this description may refer to any structure that forms a loop, or a continuous shape with no ends. "Annular" shapes include but are not limited to a circular shape, an elliptic shape, and a polygonal shape with sharp or rounded corners.

The core 50 has a quadrangular cross section as shown in FIG. 3D, and has an elliptic shape as a whole in the X-Y plane shown in FIG. 4A. The core 50 includes the through-hole 50a on the inner side. As shown in FIGS. 3D and 4A, the core 50 has an inner space Sp1 that is formed by the through-hole 50a.

As shown in FIGS. 4A, 4B, 4C, the first winding 60 is wound around the core 50, and the second winding 61 is wound around the core 50. More specifically, the core 50, which has an elliptic shape as shown in FIG. 4A, has a major axis extending along the X-axis in FIG. 4A and a minor axis extending along the Y-axis in FIG. 4A.

The windings 60, 61 are wound around sections of the core 50 that extend along the major axis (the X-axis in FIG. 4A). The winding directions of the two windings 60 and 61 are opposite to each other. Further, the first winding 60 and the second winding 61 are opposed to each other while being spaced apart from each other.

A plastic case (not shown) is provided between the core 50 and the windings 60 and 61. A protrusion (not shown) extends from the plastic case. The metal thin film 70 is restricted from moving by contacting the protrusion.

The metal thin film 70 shown in FIGS. 3A, 3B, 3C, 3D is made of copper foil. That is, the metal thin film 70 is an annular conductor that has the shape of a thin film. The thickness of the metal thin film 70 is 10 μm to 100 μm. For example, the thickness of the metal thin film 70 is 35 μm. The reason for using a thin material as the metal thin film 70 is to increase the resistance against the current (induced current) in the metal thin film 70, thereby converting the current into heat. On the other hand, when the metal thin film 70 is made thin, it is difficult to maintain the strength and the shape.

As shown in FIGS. 3C and 3D, the metal thin film 70 is annular, specifically band-shaped and endless. The metal thin film 70 covers the core 50 while extending over the first winding 60 and the second winding 61. Specifically, the metal thin film 70 is configured to cover the entire first winding 60, the entire second winding 61, and the inner space Sp1 (refer to FIGS. 3D and 4A) of the core 50. That is, the metal thin film 70 surrounds the first winding 60, the second winding 61, and the core 50. In a broad sense, the metal thin film 70 is configured to cover at least sections of the first winding 60, the second winding 61, and the inner space Sp1 (refer to FIGS. 3D and 4A) of the core 50. The inner space Sp1 exists between the first winding 60 and the second winding 61. The metal thin film 70 includes sections that are opposed to each other with the through-hole 50a in between. In other words, between the first winding 60 and the second winding 61, sections of the metal thin film 70 that are opposed to each other with the inner space Sp1 in between are spaced apart from each other. That is, between the first winding 60 and the second winding 61, the sections of the metal thin film 70 that are opposed to each other with the inner space Sp1 in between are not electrically connected to each other. The metal thin film 70 at least partially covers sections of the first winding 60 and the second winding 61 that are on the radially outer side of the core 50. The sections of the first winding 60 and the second winding 61 that are on the radially outer side of the core 50 refer to sections that are visible in a front view of the first winding 60 and the second winding 61 (refer to FIG. 4B).

The metal thin film 70 has a plastic layer 80 between the inner circumferential surface and the outer surfaces of the first and second windings 60, 61. The plastic layer 80 is fixed to the metal thin film 70.

As shown in FIGS. 3C and 3D, the plastic layer 80 ensures the insulation as well as the strength and the high rigidity of the metal thin film 70. The plastic layer 80 is made of polyimide and maintains the strength and the shape of the thin metal thin film 70. When currents flow through the windings 60, 61, a magnetic field is generated. The magnetic field causes an induced current to flow through the metal thin film 70. At this time, if the windings 60, 61 are close to the metal thin film 70, the induced current readily flows through the metal thin film 70. Accordingly, the windings 60, 61 and the metal thin film 70 are preferably as close as possible to each other. The plastic layer 80 is thus thin, for example, with a thickness of 10 μm.

The metal thin film 70 and the plastic layer 80 are bonded together by an adhesive (not shown). The adhesive may be a thermosetting adhesive (a common adhesive), a thermoplastic adhesive (hot-melt adhesive), or a pressure sensitive adhesive.

The metal thin film 70 is made of a band-shaped metal thin film that is integrated with a plastic layer by the same manufacturing method as a method for manufacturing a general flexible substrate. The annular metal thin film 70 is formed by bending the metal thin film together with the plastic layer and welding the opposite ends of the metal thin film to each other. If the metal thin film and the plastic layer are integrated in this manner, it is easy to form the metal thin film into an annular shape. This improves productivity.

Figure 5A:
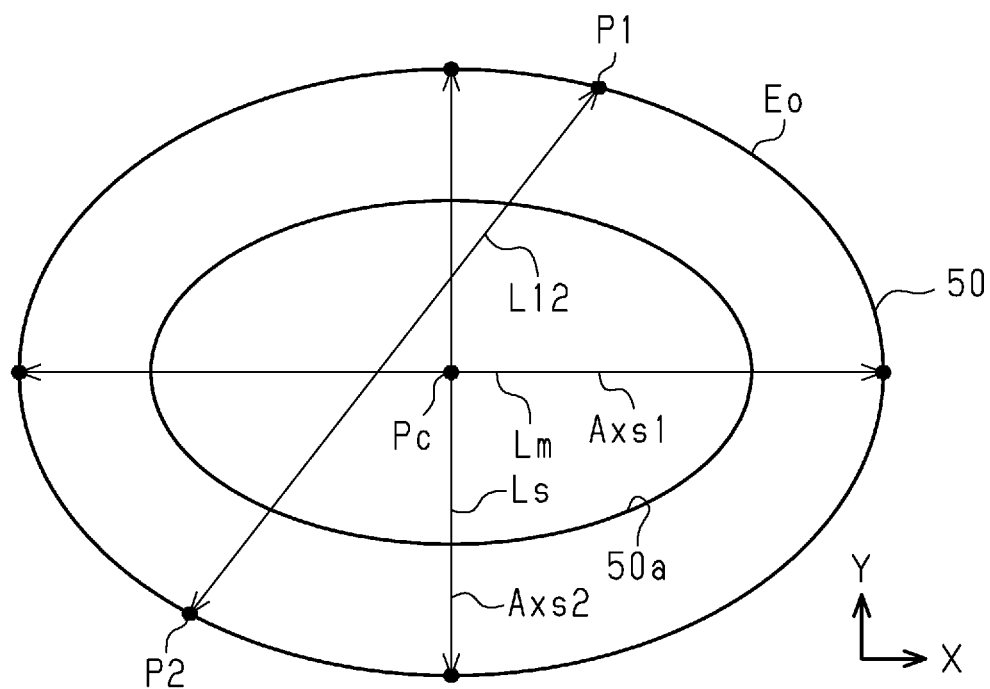
FIG. 5A is a plan view of the core.
Figure 5B:
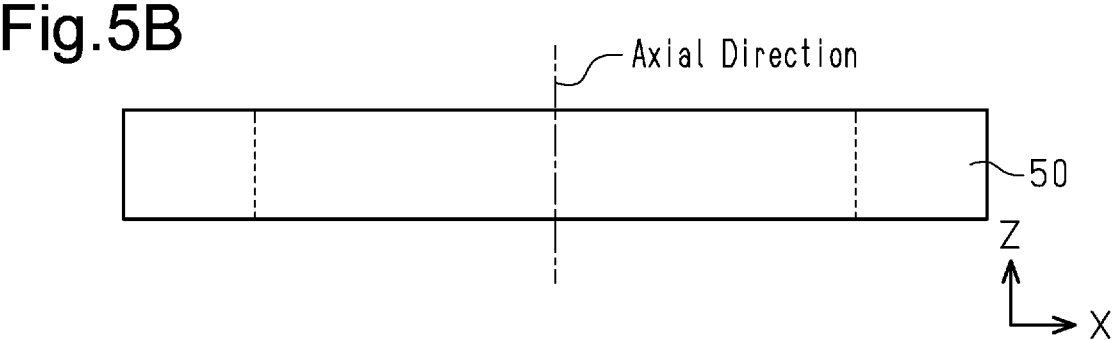
FIG. 5B is a front view of the core of FIG. 5A.

As shown in FIGS. 5A and 5B, when the through-hole 50a is viewed from the front, the elliptic core 50 has a shape that is symmetrical with respect to each of symmetry axes Axs1, Axs2 having different lengths. Specifically, as shown in FIG. 5A, among straight lines L12 that connect two arbitrary points P1, P2 on an outer edge Eo of the core 50, a longest straight line Lm is the first symmetry axis Axs1. The core 50 is symmetrical with respect to the first symmetry axis Axs1 as viewed in the axial direction (refer to FIG. 5B), that is, when the through-hole 50a is viewed from the front. Also, as shown in FIG. 5A, among straight lines that connect two arbitrary points P1, P2 on the outer edge Eo of the core 50 and includes a center point Pc of the longest straight line Lm, a shortest straight line Ls is the second symmetry axis Axs2. The core 50 is symmetrical with respect to the second symmetry axis Axs2 as viewed in the axial direction (refer to FIG. 5B), that is, when the through-hole 50a is viewed from the front. The first symmetry axis Axs1 corresponds to the major axis of the core 50, and the second symmetry axis Axs2 corresponds to the minor axis of the core 50.

As shown in FIGS. 4A and 4B, when the core 50 is viewed in the axial direction, the first winding 60 is located on one side of one of the symmetry axes Axs1, Axs2, the second winding 61 is located on the other side, and the first winding 60 and the second winding 61 are arranged to be separated from each other, so that the one of the symmetry axes Axs1, Axs2 is located between the first winding 60 and the second winding 61. Specifically, when the core 50 is viewed in the axial direction, the first winding 60 is located on one side of the first symmetry axis Axs1 of the core 50, the second winding 61 is located on the other side, and the first winding 60 and the second winding 61 are arranged to be separated from each other, so that the first symmetry axis Axs1 is located between the first winding 60 and the second winding 61. Alternatively, when the core 50 is viewed in the axial direction, the first winding 60 may be located on one side of the second symmetry axis Axs2 of the core 50, the second winding 61 may be located on the other side, and the first winding 60 and the second winding 61 may be arranged to be separated from each other, so that the second symmetry axis Axs2 is located between the first winding 60 and the second winding 61.

As shown in FIG. 4A, the first winding 60 and the second winding 61 are arranged at positions where the first winding 60 and the second winding 61 are symmetrical with respect to the first symmetry axis Axs1 when the through-hole 50a is viewed from the front. Also, when the through-hole 50a is viewed from the front, the first winding 60 is arranged at a position where the first winding 60 is symmetrical with respect to the second symmetry axis Axs2, and the second winding 61 is arranged at a position where the second winding 61 is symmetrical with respect to the second symmetry axis Axs2.

As shown in FIG. 3A, two sections of the elliptic core 50 that extend along the minor axis are exposed sections 53, 54, which are not covered with the metal thin film 70.

Next, an operation will be described.

First, the normal mode (differential mode) will be described with reference to FIGS. 6 and 7.

Figure 6:
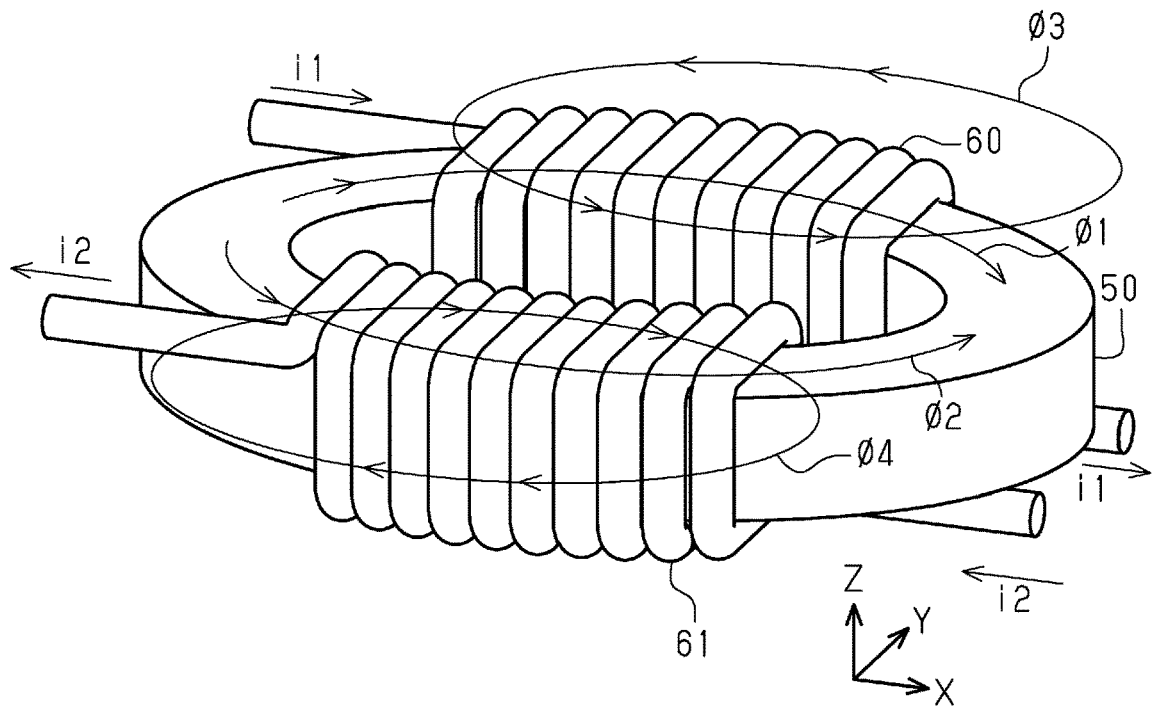
FIG. 6 is a perspective view illustrating an operation of the core and the windings.
Figure 7:
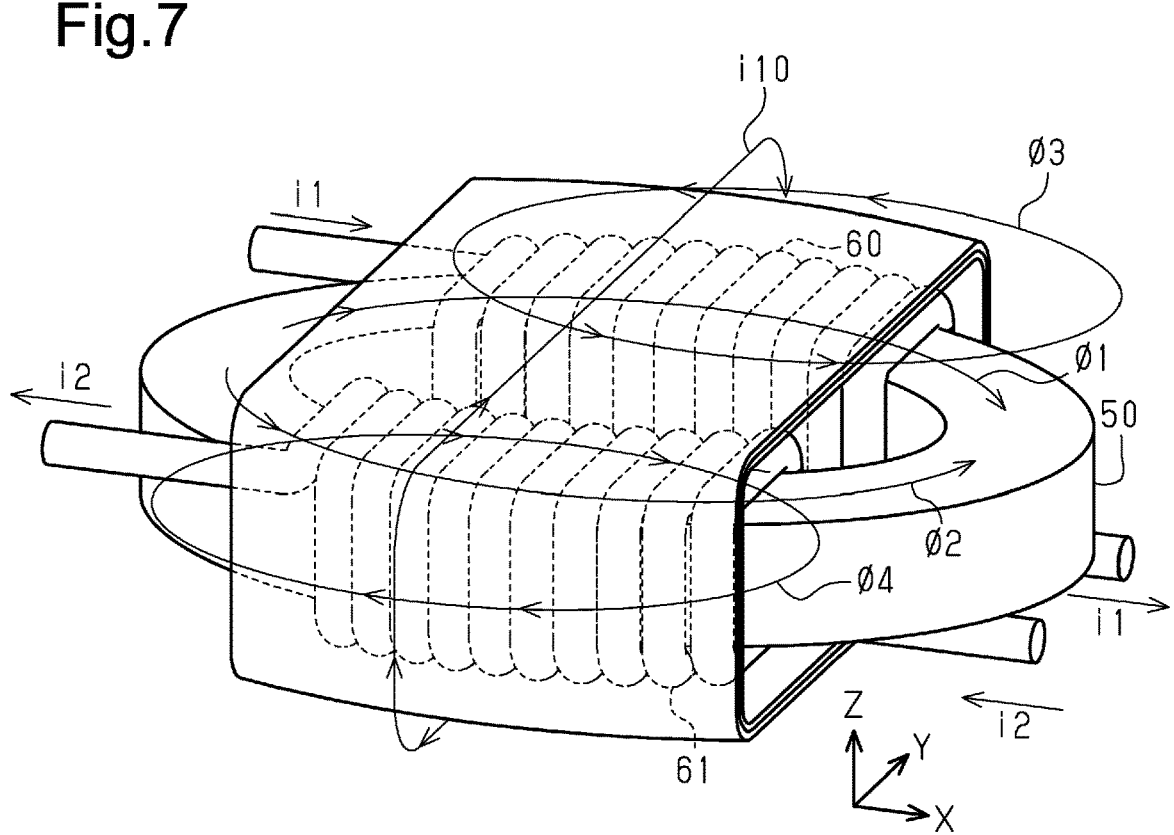
FIG. 7 is a perspective view illustrating an operation of the common mode choke coil.

As shown in FIG. 6, energization of the first winding 60 and the second winding 61 causes currents i1 and i2 to flow through the first winding 60 and the second winding 61. This generates magnetic fluxes $\varphi 1$, $\varphi 2$ in the core 50 and leakage magnetic fluxes $\varphi 3$, $\varphi 4$. The magnetic fluxes $\varphi 1$, $\varphi 2$ are opposite to each other. The core 50 has an elliptic shape, and the leakage magnetic fluxes $\varphi 3$, $\varphi 4$ are in fixed directions. As shown in FIG. 7, an induced current (eddy current) i10 flows in the peripheral direction inside the metal thin film 70 so as to generate magnetic fluxes in the direction resisting the generated leakage flux $\varphi 3$, $\varphi 4$. The induced current flowing in the peripheral direction refers to a situation in which the induced current flows around the core 50.

In this manner, when leakage magnetic fluxes are generated by energization of the first winding 60 and the second winding 61, the induced current i10 flows in the peripheral direction inside the metal thin film 70 so as to generate a magnetic flux in a direction resisting the leakage magnetic fluxes.

In the common mode, energization of the first winding 60 and the second winding 61 causes currents to flow in the same direction through the first winding 60 and the second winding 61. This generates magnetic fluxes in the same direction in the core 50. In this manner, magnetic fluxes inside the core 50 maintain the common impedance.

Figure 8:
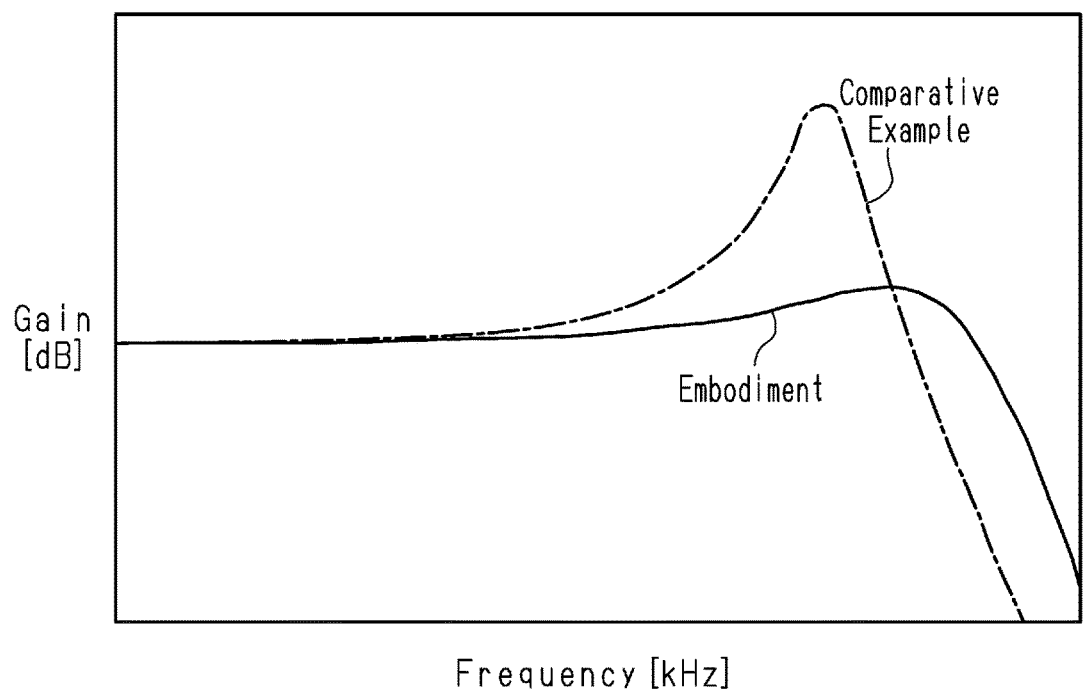
FIG. 8 is a graph showing the frequency characteristic of the gain of a low-pass filter circuit.

Next, the frequency characteristic of the low-pass filter circuit 36 will be described with reference to FIG. 8. FIG. 8 is a graph showing the frequency characteristic of the gain (attenuation amount) of the low-pass filter circuit 36 in relation to inflow normal-mode noise. The solid line in FIG. 8 represents the gain in a case in which the common mode choke coil 34 has a thin film 70 made of a conductor, and the long dashed short dashed line in FIG. 8 represents the gain in a case in which the common mode choke coil 34 does not have the thin film 70 made of a conductor. In FIG. 8, the frequency is plotted logarithmically on the horizontal axis. The gain is a type of parameter indicating an amount by which the normal mode noise can be reduced.

When the common mode choke coil 34 does not have the thin film 70 made of a conductor, the Q factor of the low-pass filter circuit 36 (more specifically, the LC resonance circuit including the common mode choke coil 34 and the X capacitor 35) is relatively high as indicated by the long dashed short dashed line in FIG. 8. Therefore, the normal mode noise having the frequency close to the resonance frequency of the low-pass filter circuit 36 cannot be easily reduced.

In contrast, in the present embodiment, the common mode choke coil 34 has the thin film 70 made of a conductor at a position where an induced current is generated by magnetic fluxes (the leak magnetic fluxes $\varphi 3$, $\varphi 4$) generated in the common mode choke coil 34. The thin film 70 made of a conductor is provided at a position passing through the loops of the magnetic fluxes $\varphi 3$, $\varphi 4$ and is configured to generate an induced current (eddy current) by the leakage magnetic fluxes φ3, φ4. The induced current (eddy current) generates magnetic fluxes in a direction canceling the leakage magnetic fluxes φ3, φ4. As a result, the thin film 70 made of a conductor is used to lower the Q factor of the low-pass filter circuit 36. Thus, as indicated by the solid line in FIG. 8, the Q factor of the low-pass filter circuit 36 is low. Therefore, the normal mode noise having the frequency near the resonance frequency of the low-pass filter circuit 36 is also reduced by the low-pass filter circuit 36.

As described above, the common mode choke coil 34 has a metal shielding structure with the metal thin film 70, which is band-shaped and endless. The common mode choke coil 34 is thus used in the low-pass filter circuit 36 to reduce common mode noise. Also, the common mode choke coil 34 positively uses the leakage magnetic fluxes generated in response to the normal mode current (differential mode current). Accordingly, the low-pass filter circuit 36 acquires an appropriate filtering performance with reduction in the normal mode noise (differential mode noise). That is, the use of the metal thin film 70, which is band-shaped and endless, generates magnetic fluxes that resist the leakage magnetic fluxes generated by the flow of the normal mode current (differential mode current), and current flows in the metal thin film 70 by electromagnetic induction. The current is consumed as heat in the metal thin film 70. Since the metal thin film 70 functions as a resistance, a damping effect is obtained and the resonance peak generated by the low-pass filter circuit 36 is suppressed (see FIG. 8). Also, when the common mode current flows, the magnetic fluxes inside the core 50 maintain the common impedance. Furthermore, the plastic layer (polyimide layer) 80 is provided on the inner peripheral side of the metal thin film (metal foil) 70. This maintains the shape of the metal thin film 70 and ensures the insulation between the metal thin film 70 and the windings 60, 61.

The core 50 has a shape of a non-perfect circle so that leakage magnetic fluxes in fixed directions are generated. Accordingly, not only of a common mode inductance, but also a normal mode inductance is obtained. Further, the leakage magnetic fluxes allow the metal thin film 70 to exert damping effect.

The first embodiment has the following advantages.

(1) The in-vehicle motor-driven compressor 11 includes the inverter device 30, which drives the electric motor 19. The inverter device 30 includes the inverter circuit 31 and the noise reducing unit 32. The noise reducing unit 32 includes the common mode choke coil 34 and the X capacitor 35. The X capacitor 35, which is a smoothing capacitor, makes up the low-pass filter circuit 36 together with the common mode choke coil 34. The common mode choke coil 34 includes the annular core 50, which includes the through-hole 50a on the inner side, the first winding 60, which is wound around the core 50, the second winding 61, which is wound around the core 50, and the metal thin film 70, which is an annular conductor. The second winding 61 is opposed to the first winding 60 while being spaced apart from the first winding 60. The metal thin film 70 covers the core 50 while extending over the first winding 60 and the second winding 61. When the through-hole 50a is viewed from the front, the core 50 has a shape that is symmetrical with respect to each of the symmetry axes Axs1, Axs2, which have different lengths. The first winding 60 is located on one side of one of the symmetry axes Axs1, Axs2, and the second winding 61 is located on the other side. The first winding 60 and the second winding 61 are arranged to be separated from each other. The core 50 includes the exposed sections 53, 54, which are not covered with the metal thin film 70.

The core 50 thus has a superior heat radiation performance. The metal thin film 70 is annular and covers the core 50 while extending over the first winding 60 and the second winding 61. Accordingly, when a normal-mode current flows, leakage magnetic fluxes are generated. The leakage magnetic fluxes in turn cause an induced current to flow through the metal thin film 70. The induced current is converted into a thermal energy in the metal thin film 70. The common mode choke coil 34 thus has a superior damping effect. The leakage magnetic fluxes generated from the first winding 60 and the second winding 61 form loops that pass through the exposed sections 53, 54 of the core 50 and intersect with the metal thin film 70 (conductor). This readily allows an induced current to flow through the metal thin film 70 (conductor). Since the generated leakage magnetic fluxes are generated, the normal mode choke coil can be omitted.

(2) The core 50 is elliptic and thus practical.

(3) The first winding 60 and the second winding 61 are arranged at positions where the first winding 60 and the second winding 61 are symmetrical with respect to the first symmetry axis Axs1 when the through-hole 50a is viewed from the front. This configuration is practical.

(4) When the through-hole 50a is viewed from the front, the first winding 60 is arranged at a position where the first winding 60 is symmetrical with respect to the second symmetry axis Axs2, and the second winding 61 is arranged at a position where the second winding 61 is symmetrical with respect to the second symmetry axis Axs2. This configuration is practical.

(5) The conductor (70) is a thin film, and the plastic layer 80 is provided between the inner peripheral surface of the conductor (70) and the outer surfaces of the first and second windings 60, 61. Therefore, even if the conductor is made of a thin film, insulation is ensured while maintaining the strength and increasing the rigidity. If the conductor is made of a thin film, the resistance of the conductor is increased. This configuration allows for formation of a compact filter circuit with excellent heat radiation performance and damping effect.

Figure 9:
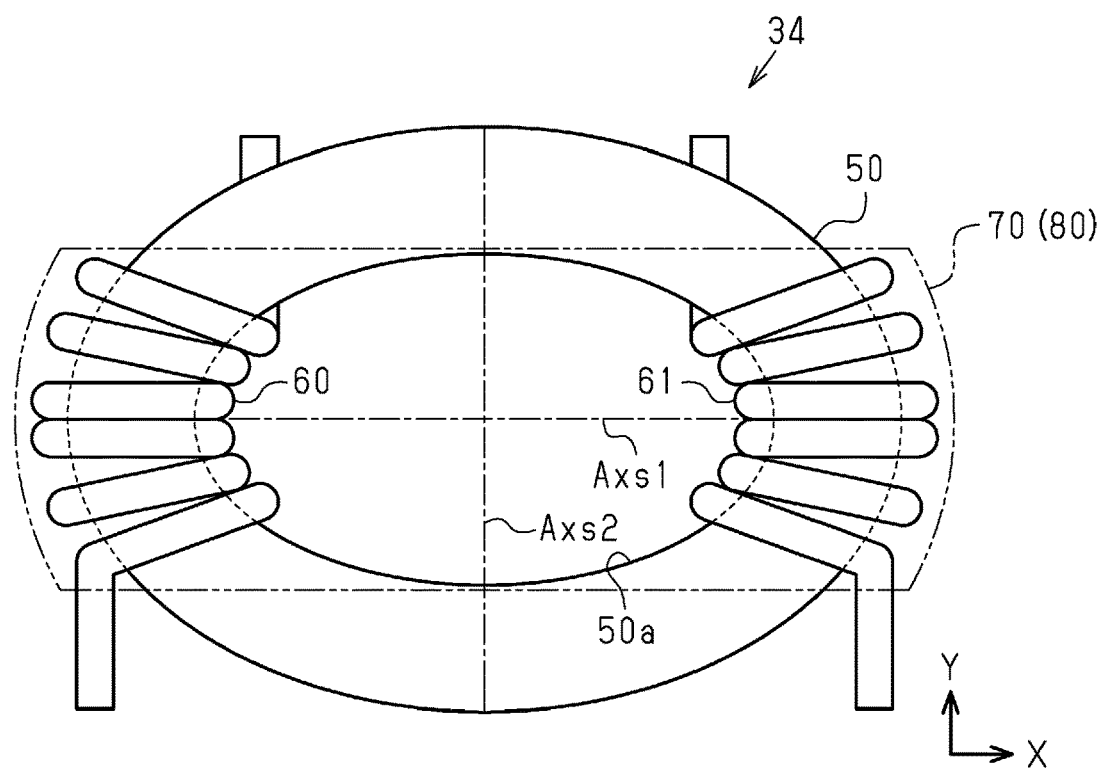
FIG. 9 is a plan view of a common mode choke coil according to a modification.

A common mode choke coil 34 shown in FIG. 9 may be employed. In FIG. 9, windings 60, 61 are wound around sections of a core 50 that extend along a minor axis (the Y-axis in FIG. 9). Even in this case, when the core 50 is viewed in the axial direction, the first winding 60 is arranged at a position where the first winding 60 is symmetrical with respect to a first symmetry axis Axs1, and the second winding 61 is arranged at a position where the second winding 61 is symmetrical with respect to the first symmetry axis Axs1. Also, when the core 50 is viewed in the axial direction, the first winding 60 and the second winding 61 are arranged at positions where the first winding 60 and the second winding 61 are symmetrical with respect to a second symmetry axis Axs2 and are separated from each other.

Figure 10:
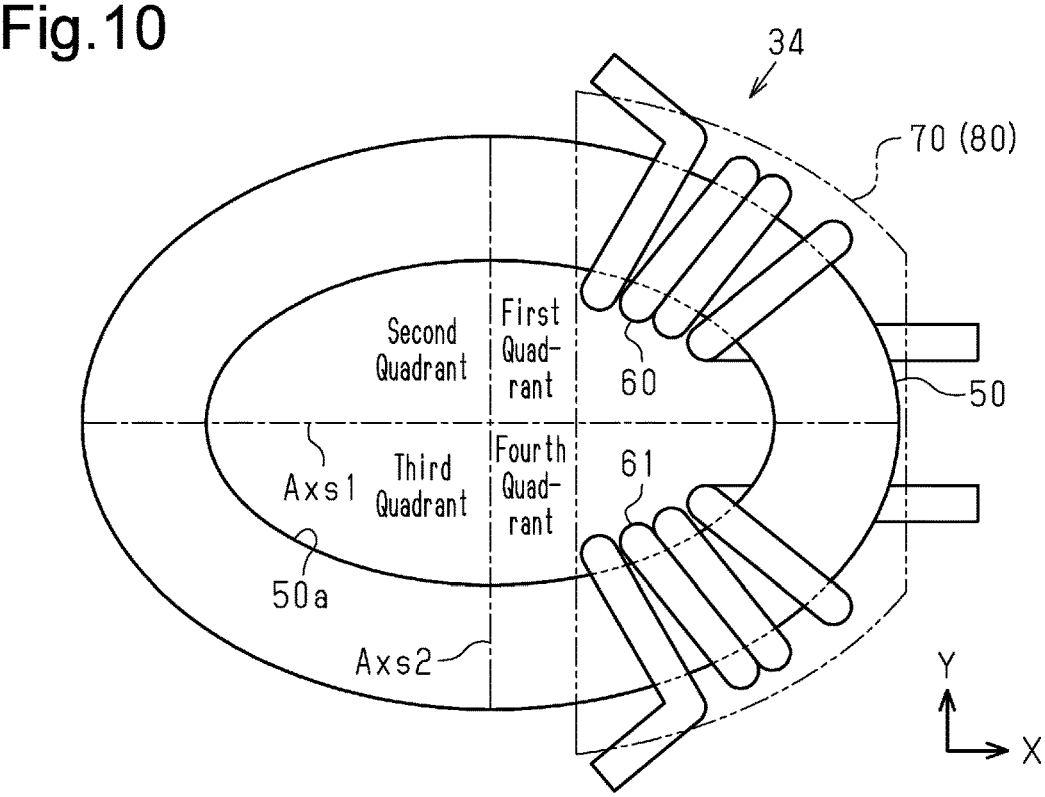
FIG. 10 is a plan view of a common mode choke coil according to a modification.

Alternatively, a common mode choke coil 34 shown in FIG. 10 may be employed. In FIG. 10, an orthogonal coordinate system of two axes, or a first symmetry axis Axs1 and a second symmetry axis Axs2, is defined. A winding 60 is arranged in the first quadrant of the orthogonal coordinate system, and a winding 61 is arranged in the fourth quadrant of the orthogonal coordinate system. In this case, when the core 50 is viewed in the axial direction, the first winding 60 and the second winding 61 are arranged at positions where the first winding 60 and the second winding 61 are symmetrical with respect to the first symmetry axis Axs1 of the core 50. Also, when the core 50 is viewed in the axial direction, each of the first winding 60 and the second winding 61 is arranged at a position where it is asymmetrical with respect to the second symmetry axis Axs2 of the core 50.

Figure 11:
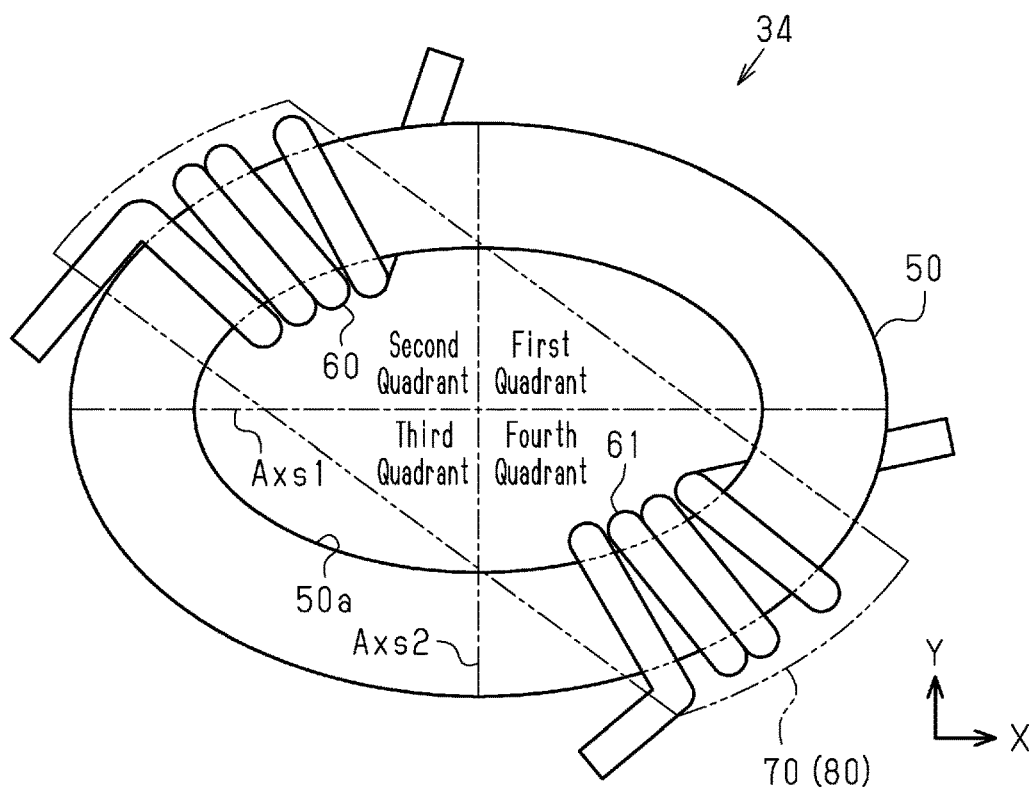
FIG. 11 is a plan view of a common mode choke coil according to a modification.

Further, a common mode choke coil 34 shown in FIG. 11 may be employed. In FIG. 11, an orthogonal coordinate system of two axes, or a first symmetry axis Axs1 and a second symmetry axis Axs2, is defined. A winding 60 is arranged in the second quadrant of the orthogonal coordinate system, and a winding 61 is arranged in the fourth quadrant of the orthogonal coordinate system. In this case, when the core 50 is viewed in the axial direction, the first winding 60 and the second winding 61 are arranged at positions where the first winding 60 and the second winding 61 are asymmetrical with respect to the first symmetry axis Axs1 of the core 50. Also, when the core 50 is viewed in the axial direction, the first winding 60 and the second winding 61 are arranged at positions where the first winding 60 and the second winding 61 are asymmetrical with respect to the second symmetry axis Axs2 of the core 50.

Second Embodiment

A second embodiment will now be described. Differences from the first embodiment will be mainly discussed.

The second embodiment employs the structure shown in FIGS. 12A, 12B, 12C, and 12D instead of the structure shown in FIGS. 3A 3B, 3C, and 3D.

In FIGS. 12A, 12B, 12C, and 12D, a common mode choke coil 90 includes an annular core 100, which includes a through-hole 100a on the inner side, a first winding 110, which is wound around the core 100, a second winding 111, which is wound around the core 100, and a metal thin film 120, which is an annular conductor. The second winding 111 is opposed to the first winding 110 while being spaced apart from the first winding 110. The metal thin film 120 covers the core 100 while extending over the first winding 110 and the second winding 111.

Figure 13A:
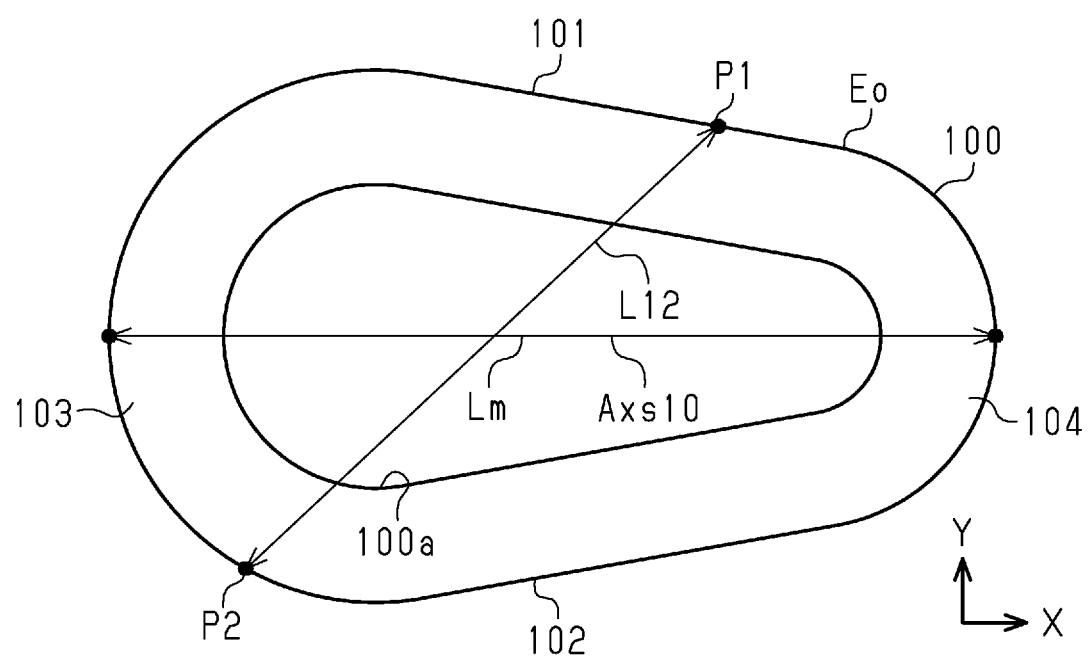
FIG. 13A is a plan view of the core.
Figure 13B:
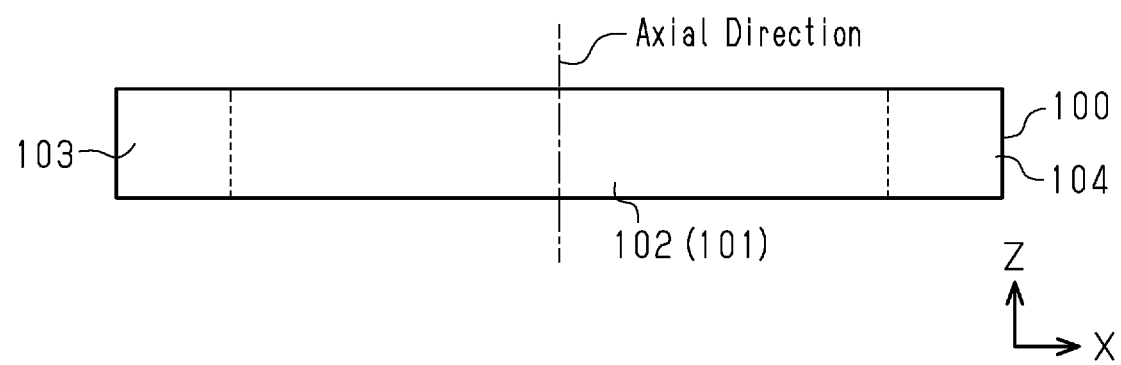
FIG. 13B is a front view of the core of FIG. 13A.

As shown in FIGS. 13A and 13B, the core 100 includes, as viewed in the axial direction, a first straight section 101, a second straight section 102, a first arcuate section 103, which is a large arc, and a second arcuate section 104, which is a small arc. One end of the first straight section 101 and one end of the second straight section 102 are connected to each other by the first arcuate section 103, and the other end of the first straight section 101 and the other end of the second straight section 102 are connected to each other by the second arcuate section 104.

Among straight lines L12 that connect two arbitrary points P1, P2 on an outer edge Eo of the core 100, a longest straight line Lm is a symmetry axis Axs10. The core 100 is symmetrical with respect to the symmetry axis Axs10 as viewed in the axial direction, that is, when the through-hole 100a is viewed from the front. As shown in FIG. 12A, the first winding 110 is wound about a center portion of the first straight section 101. Also, the second winding 111 is wound about a center portion of the second straight section 102. When the core 100 is viewed in the axial direction, the first winding 110 is located on one side of the symmetry axis Axs10, the second winding 111 is located on the other side, and the first winding 110 and the second winding 111 are arranged to be separated from each other, so that the symmetry axis Axs10 is located between the first winding 110 and the second winding 111. When the core 100 is viewed in the axial direction, that is, when the through-hole 100a is viewed from the front, the first winding 110 and the second winding 111 are arranged at positions where the first winding 110 and the second winding 111 are symmetrical with respect to the symmetry axis Axs10.

The first arcuate section 103 and the second arcuate section 104 of the core 100 are exposed sections 105, 106, which are not covered with the metal thin film 120.

The metal thin film 120 is annular, specifically band-shaped and endless. The metal thin film 120 covers the core 100 while extending over the first winding 110 and the second winding 111. Specifically, the metal thin film 120 is configured to cover the entire first winding 110, the entire second winding 111, and an inner space Sp2 (refer to FIGS. 12A and 12D) of the core 100. In a broad sense, the metal thin film 120 is configured to cover at least sections of the first winding 110, the second winding 111, and the inner space Sp2 of the core 100. The inner space Sp2 exists between the first winding 110 and the second winding 111. Between the first winding 110 and the second winding 111, sections of the metal thin film 120 that are opposed to each other with the inner space Sp2 in between are spaced apart from each other. That is, between the first winding 110 and the second winding 111, the sections of the metal thin film 120 that are opposed to each other with the inner space Sp2 in between are not electrically connected to each other.

Figure 14:
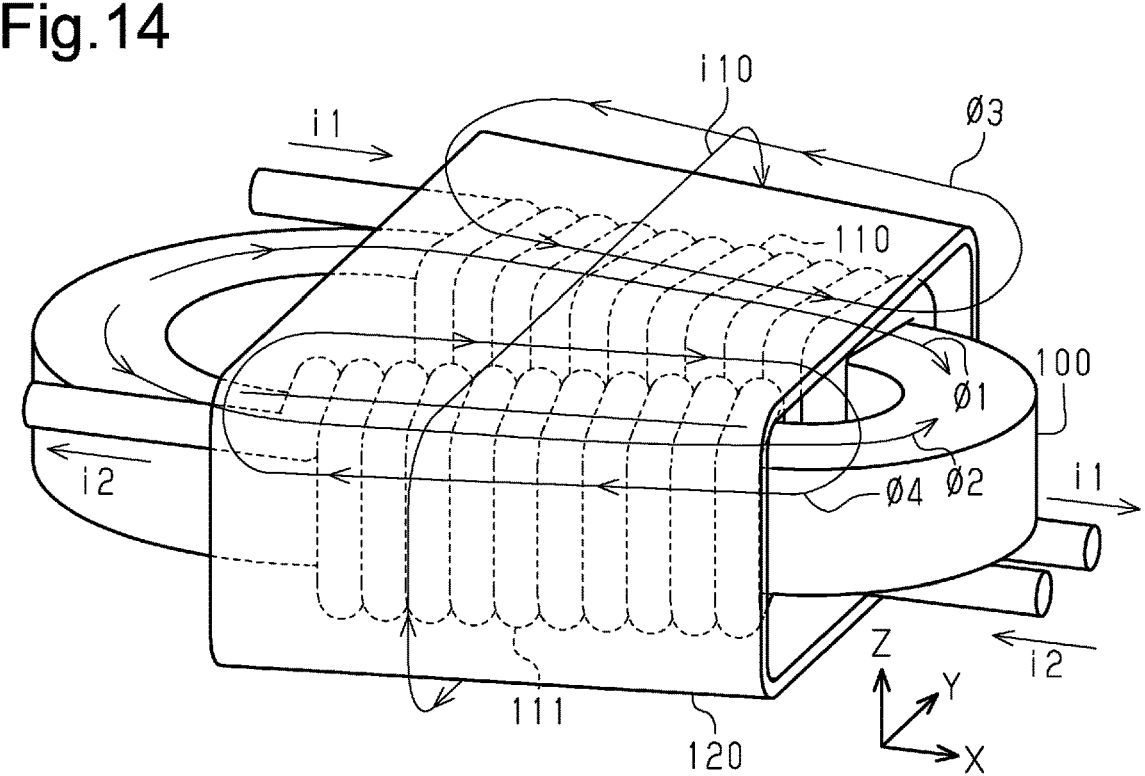
FIG. 14 is a perspective view of the common mode choke coil of FIG. 12A.

In the normal mode (differential mode), as shown in FIG. 14, energization of the first winding 110 and the second winding 111 causes currents i1 and i2 to flow through the first winding 110 and the second winding 111. This generates magnetic fluxes φ1, φ2 in the core 100 and leakage magnetic fluxes φ3, φ4. The core 100 includes the first straight section 101, the second straight section 102, the first arcuate section 103, which is a large arc, and the second arcuate section 104, which is a small arc. Thus, the leakage magnetic fluxes φ3, φ4 are in fixed directions.

As described above, the core 100 is symmetrical with respect to the only symmetry axis Axs10 when the through-hole 100a is viewed from the front. The first winding 110 is located on one side of the symmetry axis Axs10, and the second winding 111 is located on the other side. The first winding 110 and the second winding 111 are arranged to be separated from each other. The core 100 includes the exposed sections 105, 106, which are not covered with the metal thin film 120. When the through-hole 100a is viewed from the front, the first winding 110 and the second winding 111 are arranged at positions where the first winding 110 and the second winding 111 are symmetrical with respect to the symmetry axis Axs10.

The core 100 includes the exposed sections 105, 106, which are not covered with the metal thin film 120, and thus has a superior heat radiation performance. The metal thin film 120 is annular and covers the core 100 while extending over the first winding 110 and the second winding 111. Accordingly, when a normal-mode current flows, leakage magnetic fluxes are generated. The leakage magnetic fluxes in turn cause an induced current to flow through the metal thin film 120. The induced current is converted into a thermal energy in the metal thin film 120. The common mode choke coil 90 thus has a superior damping effect. The leakage magnetic fluxes generated from the first winding 110 and the second winding 111 form loops that pass through the exposed sections 105, 106 of the core 100 and intersect with the metal thin film 120 (conductor). This readily allows an induced current to flow through the metal thin film 120 (conductor). Since the generated leakage magnetic fluxes are generated, the normal mode choke coil can be omitted.

Figure 15:
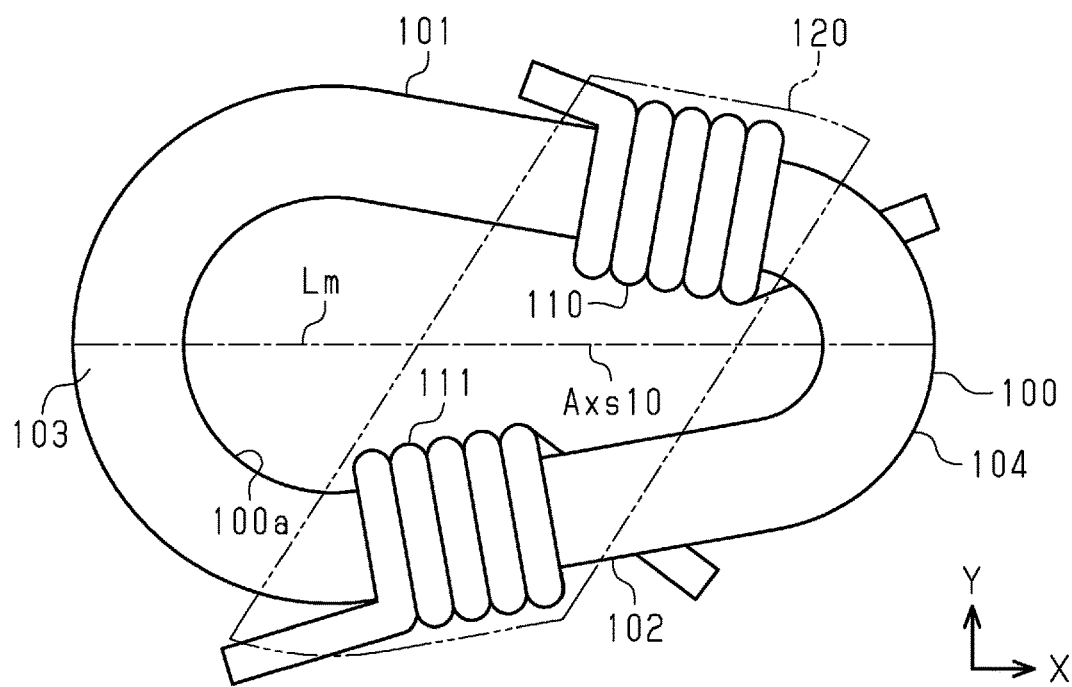
FIG. 15 is a plan view of a common mode choke coil according to a modification.

A common mode choke coil 90 shown in FIG. 15 may be employed. In FIG. 15, the first winding 110 is wound around a section of the first straight section 101 that is offset to the right (a section close to the second arcuate section 104), and the second winding 111 is wound around a section of the second straight section 102 that is offset to the left (a section close to the first arcuate section 103). In this case, the first winding 110 and the second winding 111 are arranged at positions where the first winding 110 and the second winding 111 are asymmetrical with respect to the symmetry axis Axs10.

The above described embodiments may be modified as follows.

The annular cores may have any shape that is not a perfect circle. Other than the elliptic shape shown in FIG. 3A and the shape shown in FIG. 12A, the cores may have a rectangular shape or a square shape. In short, the cores are useful when the cores do not have the shape of a perfect circle as viewed in the axial direction, but have an extended shape. This is because an extended shape readily generates leakage magnetic fluxes and allows the leakage magnetic fluxes to have directional properties.

In addition to copper foil, the metal thin film 70 may be made of an aluminum foil, a brass foil, a foil of a stainless steel, or the like. These nonmagnetic metals are easy to handle since films made of these nonmagnetic metals are not magnetized by leakage magnetic fluxes and do not generate further magnetic fluxes. Further, the material of the metal thin film 70 is not limited to a nonmagnetic metal such as copper, but may be a magnetic metal such as iron.

The conductor covering the core 50 is not limited to a thin film as long as it is annular, for example, the conductor may be a relatively thick plate.

In addition to polyimide, the plastic layer 80 may be composed of polyester, PET, PEN, or the like.

The filtering performance of the low-pass filter circuit 36 can be easily changed by changing the width of the metal thin film 70.

Figure 16A:
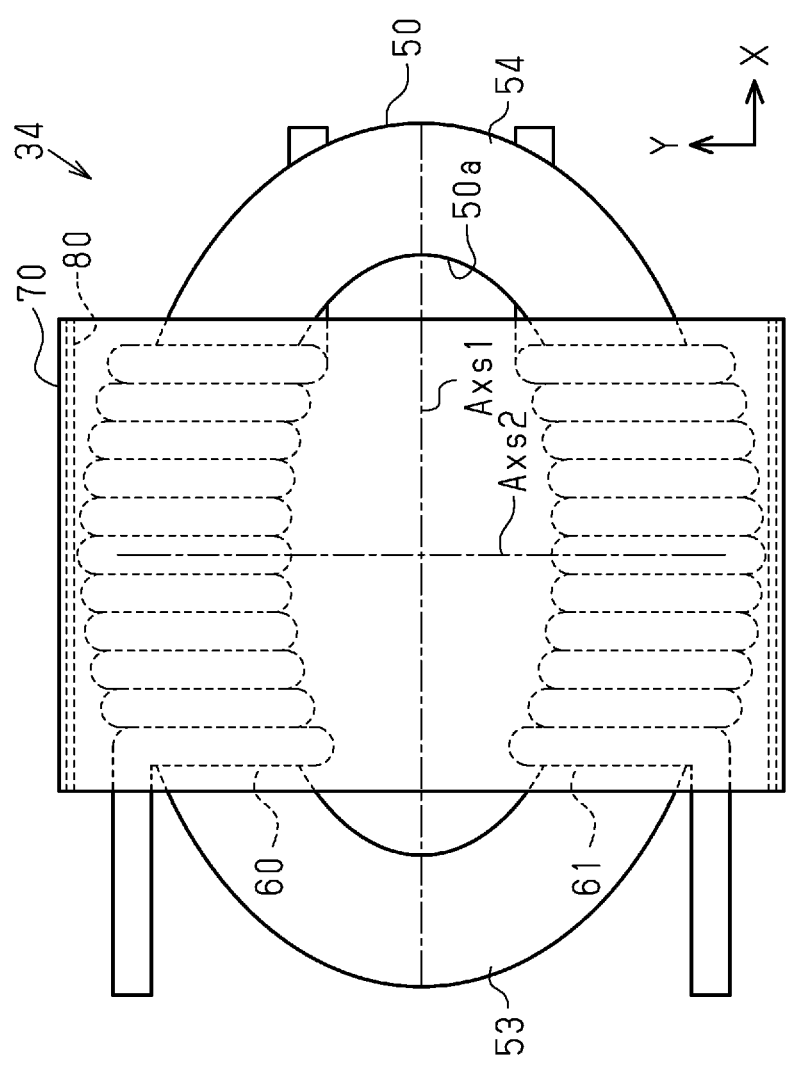
FIG. 16A is a plan view of a common mode choke coil according to a modification.
Figure 16B:
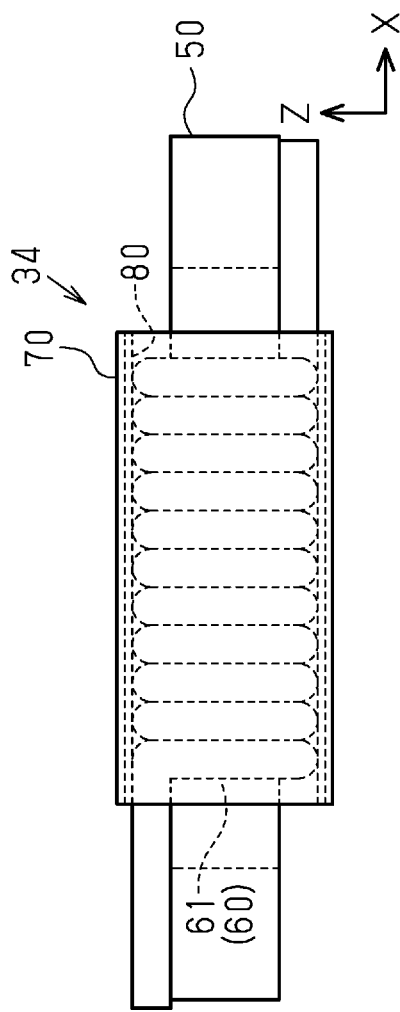
FIG. 16B is a front view of the common mode choke coil of FIG. 16A.

In the first embodiment, the metal thin film 70 may be partly curved along the first winding 60 and the second winding 61 as shown in FIG. 3A. However, the shape of the metal thin film 70 is not limited by the shapes of the first winding 60 and the second winding 61, as long as the metal thin film 70 has an annular shape as whole. For example, as shown in FIGS. 16A and 16B, sections of the metal thin film 70, specifically, the sections extending along the outer sides of the first winding 60 and the second winding 61 (refer to FIG. 16A), may have straight shapes. This configuration facilitates the process of covering the core 50 with the metal thin film 70.

Figures 17A, 17B:
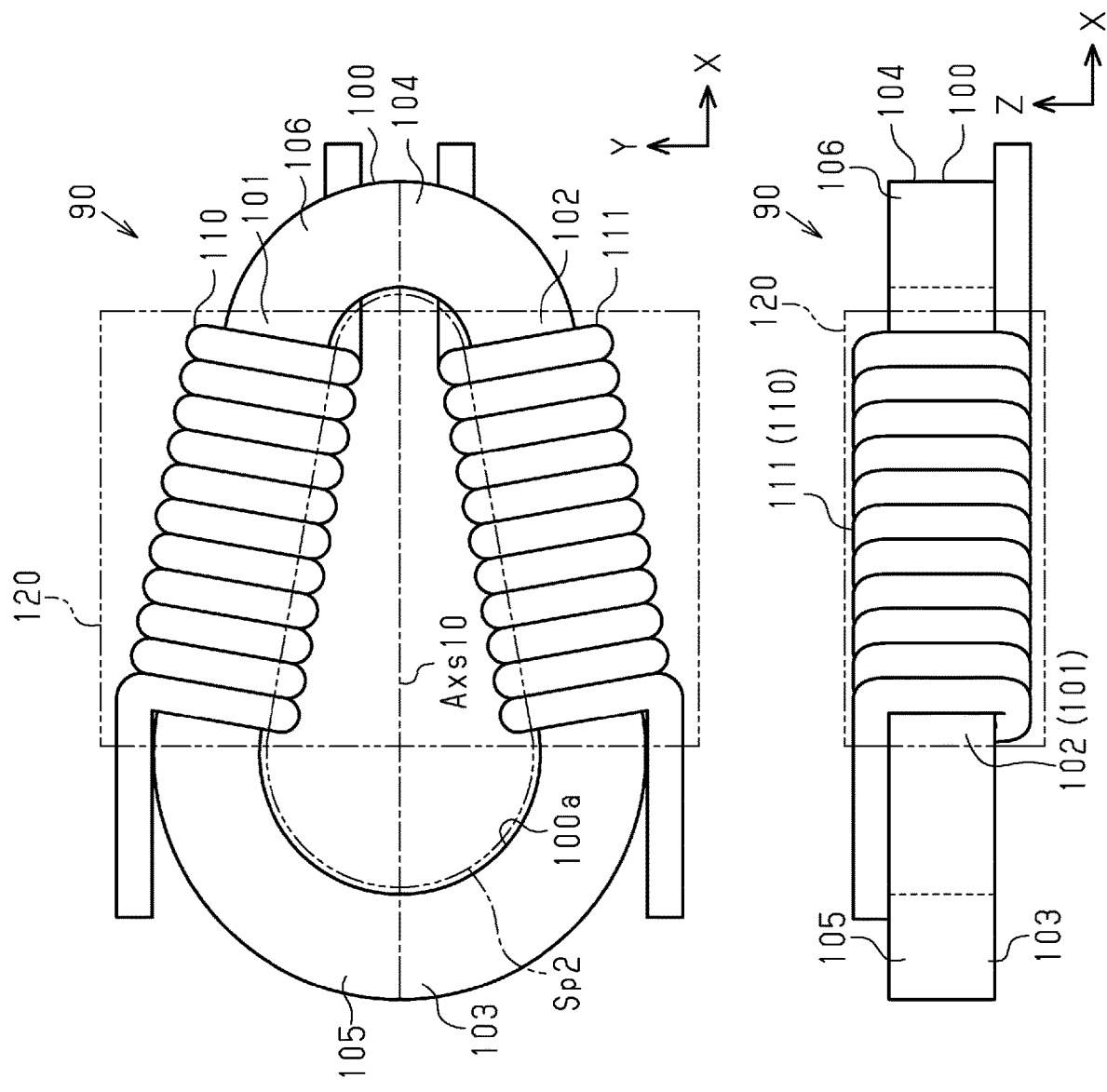
FIG. 17A is a plan view of a common mode choke coil according to a modification.
FIG. 17B is a front view of the common mode choke coil of FIG. 17A.

In the second embodiment, as shown in FIGS. 12A to 12D, the cross section of the metal thin film 120 orthogonal to the symmetry axis Axs10 is not uniform in the direction along the symmetry axis Axs10. However, as shown in FIGS. 17A and 17B, the cross section of the metal thin film 120 orthogonal to the symmetry axis Axs10 may be uniform in the direction along the symmetry axis Axs10. Such a configuration facilitates a process of covering the core 100 with the metal thin film 120.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An in-vehicle motor-driven compressor comprising:
a compression unit configured to compress fluid;
an electric motor configured to drive the compression unit; and
an inverter device configured to drive the electric motor, wherein
the inverter device includes:
an inverter circuit configured to convert DC power to AC power, and
a noise reducing unit that is provided on an input side of the inverter circuit and is configured to reduce common mode noise and normal mode noise included in the DC power before the DC power is supplied to the inverter circuit,
the noise reducing unit includes:
a common mode choke coil, and
a smoothing capacitor that makes up a low-pass filter circuit together with the common mode choke coil,
the common mode choke coil includes:
an annular core that includes a through-hole,
a first winding wound around the core,
a second winding wound around the core, the second winding being opposed to the first winding while being spaced apart from the first winding, and
an annular conductor that surrounds the first winding, the second winding, and the core, the conductor including sections that are opposed to each other with the through-hole in between,
when the through-hole is viewed from a front, the core has a shape that is symmetrical with respect to each of symmetry axes, which have different lengths,
the first winding is located on one side of one of the symmetry axes, and the second winding is located on an other side of the one of the symmetry axes, so that the one of the symmetry axes is located between the first winding and the second winding, and
the core includes an exposed section that is not covered with the conductor.

2. The in-vehicle motor-driven compressor according to claim 1, wherein the core is elliptic.

3. The in-vehicle motor-driven compressor according to claim 1, wherein, when the through-hole is viewed from the front, the first winding and the second winding are arranged at positions where the first winding and the second winding are symmetrical with respect to one of the symmetry axes.

4. An in-vehicle motor-driven compressor comprising:
a compression unit configured to compress fluid;
an electric motor configured to drive the compression unit; and
an inverter device configured to drive the electric motor, wherein
the inverter device includes:
an inverter circuit configured to convert DC power to AC power, and
a noise reducing unit that is provided on an input side of the inverter circuit and is configured to reduce common mode noise and normal mode noise included in the DC power before the DC power is supplied to the inverter circuit,
the noise reducing unit includes:
a common mode choke coil, and a smoothing capacitor that makes up a low-pass filter circuit together with the common mode choke coil, the common mode choke coil includes:
an annular core that includes a through-hole,
a first winding wound around the core,
a second winding wound around the core, the second winding being opposed to the first winding while being spaced apart from the first winding, and
an annular conductor that surrounds the first winding, the second winding, and the core, the conductor including sections that are opposed to each other with the through-hole in between, the core is symmetrical with respect to an only symmetry axis when the through-hole is viewed from a front, the first winding is located on one side of the symmetry axis, and the second winding is located on an other side the symmetry axis, so that the symmetry axis is located between the first winding and the second winding, and the core includes an exposed section that is not covered with the conductor.

5. The in-vehicle motor-driven compressor according to claim 4, wherein, when the through-hole is viewed from the front, the first winding and the second winding are arranged at positions where the first winding and the second winding are symmetrical with respect to the symmetry axis.

* * * * *